(12) United States Patent
Kano et al.

(10) Patent No.: US 11,378,792 B2
(45) Date of Patent: Jul. 5, 2022

(54) OPTICAL SYSTEM FOR MICROSCOPE, AND MICROSCOPE IN WHICH SAME IS USED

(71) Applicant: mil-kin Inc., Tokyo (JP)

(72) Inventors: Kiyofumi Kano, Gunma (JP); Hirofumi Tsuchida, Tokyo (JP); Kazuo Kajitani, Tokyo (JP)

(73) Assignee: MIL-KIN INC., Tokyo (JP)

( * ) Notice: Subject to any disclaimer, the term of this patent is extended or adjusted under 35 U.S.C. 154(b) by 260 days.

(21) Appl. No.: 16/606,970

(22) PCT Filed: Jun. 21, 2017

(86) PCT No.: PCT/JP2017/022936
§ 371 (c)(1),
(2) Date: Oct. 21, 2019

(87) PCT Pub. No.: WO2018/198387
PCT Pub. Date: Nov. 1, 2018

(65) Prior Publication Data
US 2020/0379228 A1 Dec. 3, 2020

(30) Foreign Application Priority Data
Apr. 28, 2017 (JP) ............................. JP2017-089717

(51) Int. Cl.
*G02B 21/02* (2006.01)
*G02B 15/10* (2006.01)
(Continued)

(52) U.S. Cl.
CPC ........... *G02B 21/025* (2013.01); *G02B 15/10* (2013.01); *G02B 21/36* (2013.01); *G02B 21/04* (2013.01); *G02B 21/06* (2013.01)

(58) Field of Classification Search
CPC .... G02B 21/025; G02B 21/22; G02B 21/365; G02B 21/0076; G02B 21/361;
(Continued)

(56) References Cited

U.S. PATENT DOCUMENTS 7,995,272 B2  8/2011 Bratt et al.
D682,903 S   5/2013 Bratt
(Continued)

FOREIGN PATENT DOCUMENTS

JP   2015-230356   12/2015
JP   2016-163997   9/2016
(Continued)

OTHER PUBLICATIONS

International Search Report, dated Sep. 19, 2017 (Sep. 19, 2017), pages.
(Continued)

*Primary Examiner* — William R Alexander
*Assistant Examiner* — Sharrief I Broome
(74) *Attorney, Agent, or Firm* — Rankin, Hill & Clark LLP

(57) ABSTRACT

The optical system for a microscope includes an illumination lens group G11 and an objective optical system. The objective optical system has an objective lens group G12, a first image forming lens group G13, and a second image forming lens group G14, which are disposed in this order from the object side, and satisfies the following conditional expressions. $NA_L \times 2 \leq NA_O \leq NA_L \times 15$ ... (1); $0.01 \leq NA_L \leq 0.1$ ... (2); and $25 \leq M_O \leq 100$ ... (3), where $NA_L$ denotes the numerical aperture of the illumination lens group G11, $NA_O$ denotes the numerical aperture of the objective lens group G12, and $M_O$ denotes the image-formation magnification of the objective lens group G12.

3 Claims, 14 Drawing Sheets

(51) Int. Cl.
*G02B 21/36* (2006.01)
*G02B 21/04* (2006.01)
*G02B 21/06* (2006.01)

(58) Field of Classification Search
CPC .. G02B 21/0012; G02B 21/18; G02B 21/248; G02B 21/04; G02B 21/06; G02B 21/16; G02B 21/367; G02B 21/002; G02B 21/0032; G02B 21/008; G02B 21/0088; G02B 21/241; G02B 21/0072; G02B 26/0833; G02B 21/082; A61B 90/20; A61B 90/50; A61B 10/0012; A61B 1/0008; A61B 1/00108; A61B 1/00149; A61B 1/00172; A61B 1/00188; A61B 1/00195; A61B 1/04; A61B 1/0676; A61B 1/0684; A61B 1/303; A61B 1/32; A61B 2010/0025; A61B 2017/00544; A61B 2017/00911; A61B 34/25; A61B 90/25; A61B 90/36
See application file for complete search history.

(56) References Cited

U.S. PATENT DOCUMENTS

| | | | |
|---|---|---|---|
| 2005/0167595 A1* | 8/2005 | Prelewitz | G02B 27/48 250/341.1 |
| 2009/0015913 A1 | 1/2009 | Bratt et al. | |
| 2011/0181947 A1 | 7/2011 | Yang | |
| 2012/0113524 A1* | 5/2012 | Kasahara | G02B 21/33 359/656 |
| 2015/0177147 A1 | 6/2015 | Mangan et al. | |
| 2016/0147057 A1* | 5/2016 | Nagayama | G02B 21/362 348/79 |
| 2016/0334613 A1* | 11/2016 | Ishiwata | G02B 21/22 |
| 2018/0341097 A1* | 11/2018 | Kawasaki | G02B 21/086 |

FOREIGN PATENT DOCUMENTS

| | | |
|---|---|---|
| JP | 6029159 | 10/2016 |
| JP | 2017-037191 | 2/2017 |
| WO | 2015/022996 | 2/2015 |
| WO | 2017/046973 | 3/2017 |

OTHER PUBLICATIONS

Korean Office Action dated Oct. 30, 2020, 4 pages.
European Search Report dated Nov. 27, 2020, 4 pages.
Breslauer,et al., "Mobile Phone Based Clinical Microscopy for Global Health Applications", PLOS ONE, vol. 4, No. 7, Jan. 1, 2009, 7 pages. (Cited in EP Search Report).
Zhu, et al., "Quantum Dot Enabled Detection of *Escherichia coli* Using a Cell-Phone", ANALYST, vol. 137, No. 11, Feb. 13, 2012, 5 pages. (Cited in EP Search Report).

* cited by examiner

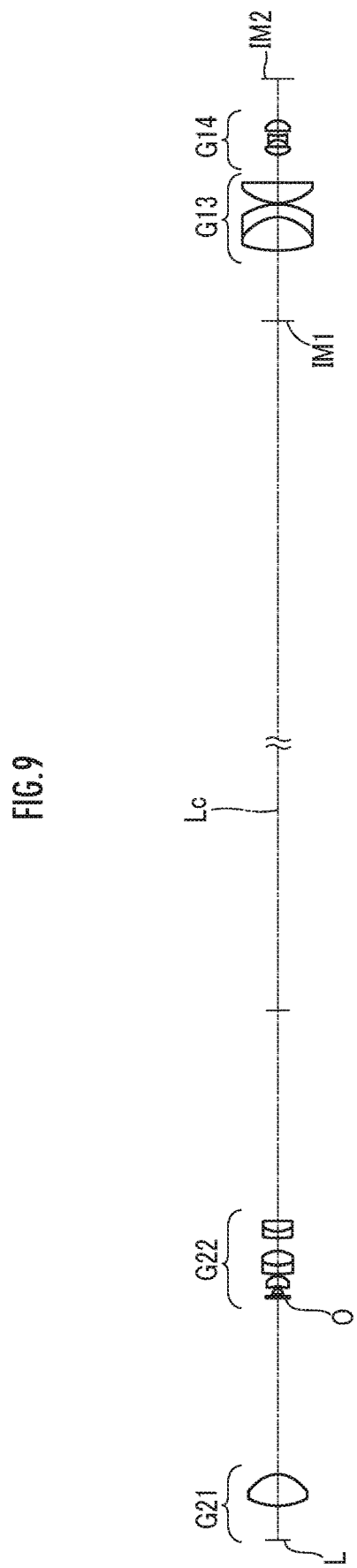

DISTORTION ABERRATION
IMAGE HEIGHT 9

ASTIGMATISM
IMAGE HEIGHT 9

SPHERICAL ABERRATION
NA 1.2

0.486
0.588
0.656

ESCHERICHIA COLI (APPROX. 3 μm)

SALMONELLA (APPROX. 2 μm)

STAPHYLOCOCCUS AUREUS (APPROX. 1 μm)

PSEUDOMONAS AERUGINOSA (APPROX. 3 μm)

SPORES OF BLUE MOLD (APPROX. 4 μm)

YEAST (CANDIDA) (APPROX. 5 μm)

WINE YEAST (APPROX. 5 μm)

INTRAORAL BACTERIA (APPROX. 0.5 TO 10 μm)

OPTICAL SYSTEM FOR MICROSCOPE, AND MICROSCOPE IN WHICH SAME IS USED

TECHNICAL FIELD

The present invention relates to a microscope adapted to capture an image of a specimen to be observed by a camera function provided in a portable information terminal and to display the captured image on the display of the portable information terminal, and a microscope optical system used in the microscope.

BACKGROUND ART

The applicant has proposed a microscope on which a portable information terminal is mounted. The microscope is adapted to capture an image of a specimen to be observed by a camera function provided in the portable information terminal, such as a smartphone or a tablet, and to display the captured image on the display of the portable information terminal as an observation image (refer to the specification of Japanese Patent Application No. 2016-163997).

Further, as an available optical system for such microscope, there has been known one in which a specimen, i.e., an object to be observed, is directly placed on a surface of the optical system, which surface is closest to the object (refer to, for example, Patent Literature 1).

CITATION LIST

Patent Literature

Patent Literature 1: Specification of U.S. Pat. No. 7,995,272

SUMMARY OF INVENTION

Technical Problem

However, the optical system described in Patent Literature 1 has been posing a problem in that, when observing a specimen of one micron order, such as bacteria, it is difficult to obtain sufficient contrast and resolution of the observation image of the specimen, so that a satisfactory observation image cannot be obtained. Therefore, when the optical system described in Patent Literature 1 is adopted for the foregoing microscope proposed by the present applicant, an image captured by a camera function provided in a portable information terminal (i.e., an observation image) will have insufficient contrast and resolution.

The present invention has been made in view of the circumstances described above, and an object of the invention is to provide an optical system for a microscope that is capable of providing sufficient contrast and resolution of an observation image even when a specimen of one micron order is placed in contact with or adjacent to a surface of the optical system, which surface is closest to the object, and a microscope using the optical system.

Solution to Problem

To this end an optical system for a microscope in accordance with the present invention is an optical system for a microscope used in a microscope which captures an image of a specimen to be observed by a camera function provided in a portable information terminal, and displays a captured image on a display of the portable information terminal, including:

a lighting optical system for applying light from a light source to the specimen; and an objective optical system for forming the light that has passed through the specimen into an image, wherein the objective optical system has an objective lens group, a first image forming lens group, and a second image forming lens group in this order from an object side, focusing is performed by moving a part or all of the second image forming lens group along an optical axis, the specimen is disposed in contact with or adjacent to a surface of the objective lens group, the surface being closest to an object, and conditional expressions (1), (2) and (3) given below are satisfied:

$$NA_L \times 2 \leq NA_O \leq NA_L \times 15 \quad (1)$$

$$0.01 \leq NA_L \leq 0.1 \quad (2)$$

$$25 \leq M_O \leq 100 \quad (3)$$

where $NA_L$ denotes a numerical aperture of the lighting optical system, $NA_O$ denotes a numerical aperture of the objective lens group, and $M_O$ denotes the image-formation magnification of the objective lens group.

Thus, according to the optical system for a microscope in accordance with the present invention, by fixing a lens component of the objective lens group that is closest to an object, a specimen can be observed by placing the specimen in contact with or adjacent to the surface on the object side (i.e., the surface of the optical system that is closest to the object) (for example, placing the specimen directly on the surface that is closest to the object or with cover glass or the like held therebetween).

In addition, in the optical system for a microscope in accordance with the present invention, conditional expressions (1) and (2) given below are required to be satisfied in order to secure proper contrast and resolution.

In the conditional expression (1), if the lower limit value is not reached, then the resolution of an image formed by the objective optical system will be insufficient. On the other hand, if the upper limit value is exceeded, then the number of optical elements (lenses or the like) required for achieving a sufficient resolution will increase, thus inconveniently leading to an extremely complex design. Further, in the conditional expression (2), if the lower limit value is not reached, then the amount of light will be insufficient with resultant poor contrast. On the other hand, if the upper limit value is exceeded, then an excessive amount of light will result, making it difficult to obtain a sufficient resolution.

Further, according to the optical system for a microscope in accordance with the present invention, the conditional expression (3) is required to be satisfied so as to enable a specimen of one micron order to be observed in an appropriate size by using an image pickup device of a regular size.

In the conditional expression (3), if the lower limit value is not reached, then the size of a specimen in an observation image will be too small. On the other hand, if the upper limit value is exceeded, then the size of the specimen in the observation image will be too large.

Thus, the optical system for a microscope in accordance with the present invention enables a captured image (i.e., an observation image) to have a proper size and sufficient contrast and resolution even when a specimen of one micron order is disposed in contact with or adjacent to a surface of an objective optical system, which surface is closest to the object, thus making it possible to image a specimen to be observed while securing a sufficient image quality by a camera function provided in a portable information terminal.

It has been experimentally found that a configuration that satisfies a conditional expression (1-1) given below in place of the conditional expression (1) is further preferred. Further, only one of the upper limit value and the lower limit value of the conditional expression (1-1) may be replaced by the upper limit value or the lower limit value of the conditional expression (1).

$$NA_L \times 2.8 \leq NA_O \leq NA_L \times 13 \quad (1\text{-}1)$$

Further, it has been experimentally found that a configuration that satisfies a conditional expression (2-1) given below in place of the conditional expression (2) is further preferred. In addition, only one of an upper limit value and a lower limit value of the conditional expression (2-1) may be replaced by the upper limit value or the lower limit value of the conditional expression (2).

$$0.07 \leq NA_L \leq 0.09 \quad (2\text{-}1)$$

It has been experimentally found that a configuration that satisfies a conditional expression (3-1) given below in place of the conditional expression (3) is further preferred.

$$30 \leq M_O \leq 100 \quad (3\text{-}1)$$

Further, according to the optical system for a microscope in accordance with the present invention, a conditional expression (4) given below is preferably satisfied:

$$2 \text{ mm} \leq Ed \leq 3 \text{ mm} \quad (4)$$

where Ed denotes an effective diameter of the foregoing lighting optical system.

The conditional expression (4) is a conditional expression for obtaining a further proper contrast. In the conditional expression (4), if the lower limit value is not reached, then it becomes difficult to obtain a sufficient amount of light. On the other hand, if the upper limit value is exceeded, then the amount of light applied to an area outside an observation range will increase, and therefore a flare tends to occur, frequently causing the contrast to deteriorate.

It has been experimentally found that a configuration in which one of conditional expressions (4-1) and (4-2) given below in place of the conditional expression (4) is satisfied is further preferred. In addition, only one of the upper limit value and the lower limit value of the conditional expression (4-1) may be replaced by the upper limit value or the lower limit value of the conditional expression (4) or (4-1), and only one of the upper limit value and lower limit value of the conditional expression (4-2) may be replaced by the upper limit value or the lower limit value of the conditional expression (4) or (4-2).

$$4 \text{ mm} \leq Ed \leq 6 \text{ mm} \quad (4\text{-}1)$$

$$4.8 \text{ mm} \leq Ed \leq 5.2 \text{ mm} \quad (4\text{-}2)$$

Further, in the optical system for a microscope in accordance with the present invention, a conditional expression (5) given below is preferably satisfied:

$$5 \text{ mm} \leq D \leq 50 \text{ mm} \quad (5)$$

where D denotes a distance from an end surface of the lighting optical system on the specimen side to the specimen.

The conditional expression (5) is a conditional expression for achieving a simpler and smaller structure of a microscope when designing the microscope by applying the foregoing optical system for a microscope. In the conditional expression (5), if the lower limit value is not reached, then the workspace for mounting a specimen cannot be secured. On the other hand, if the upper limit value is exceeded, then the size of the optical system for a microscope (eventually the microscope to be provided with the optical system) will increase and higher adjustment accuracy will be required for an illumination optical axis.

It has been experimentally found that a configuration in which a conditional expression (5-1) given below in place of the conditional expression (5) is satisfied is further preferred. In addition, only one of the upper limit value and the lower limit value of the conditional expression (5-1) may be replaced by the upper limit value or the lower limit value of the conditional expression (5).

$$28 \text{ mm} \leq D \leq 35 \text{ mm} \quad (5\text{-}1)$$

Further, to fulfill the foregoing object, a microscope in accordance with the present invention is a microscope provided with one of the foregoing optical systems for a microscope, including:

a microscope main body; and a mounting base which is connected to the microscope main body and on which the portable information terminal is mounted, wherein the microscope main body has a specimen mounting section for mounting the specimen thereon and a light source for applying light to the specimen mounting section, the lighting optical system of the optical system for a microscope is disposed between the specimen mounting section and the light source, the objective lens group of the optical system for a microscope is disposed inside the microscope main body such that a surface of the objective lens group, the surface being closest to an object, is exposed at the specimen mounting section, the first image forming lens group of the optical system for a microscope is disposed at an image side of the objective lens group inside the microscope main body, and the second image forming lens group of the optical system for a microscope is disposed inside the portable information terminal.

Thus, the microscope in accordance with the present invention can be configured at low cost by disposing the second image forming lens group, which moves at the time of focusing, inside a portable information terminal, thus combining the microscope main body and the objective lens group and the first image forming lens group, which are incorporated in the microscope main body, into a single unit.

Further, in the microscope in accordance with the present invention, the light source is preferably an LED.

An LED is advantageous in that it can be driven for an extended time on a dry cell or the like with less heat generation. In addition, unlike an electric bulb or the like, the illumination light is white, so that better observation images can be easily obtained.

BRIEF DESCRIPTION OF DRAWINGS

FIG. 9 is a sectional view along an optical axis, illustrating the configuration of a microscope optical system of a microscope according to a second embodiment;

DESCRIPTION OF EMBODIMENTS

First Embodiment

Referring to FIG. 1 to FIG. 8, the following will describe a microscope M according to a first embodiment and an optical system used with the microscope M. The microscope M is adapted to capture an image of a specimen to be observed by a camera function provided in a portable information terminal and to display the captured image on the display of the portable information terminal.

Figure 1A:
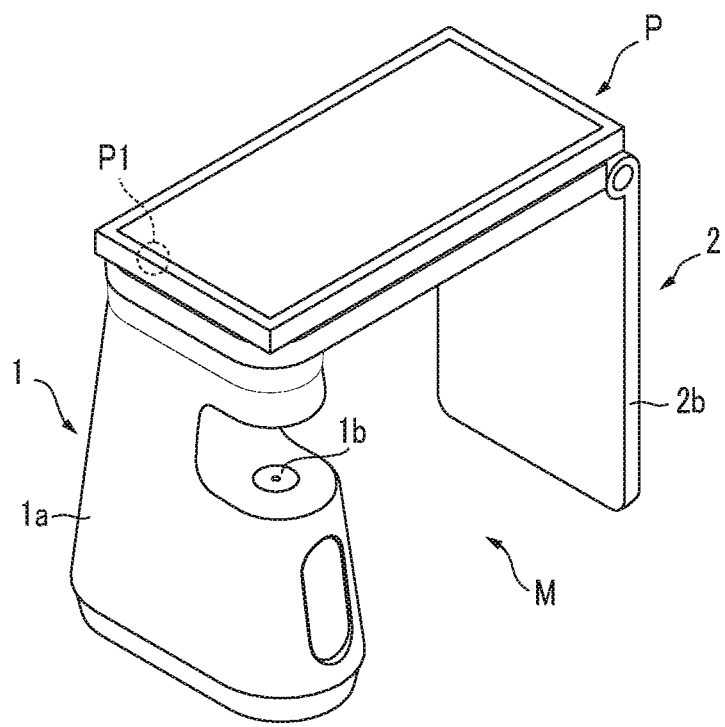
FIGS. 1A and 1B present perspective views illustrating a microscope according to a first embodiment, FIG. 1A illustrating the microscope with a portable information terminal mounted thereon, and FIG. 1B illustrating the microscope without the portable information terminal mounted thereon.
Figure 1B:
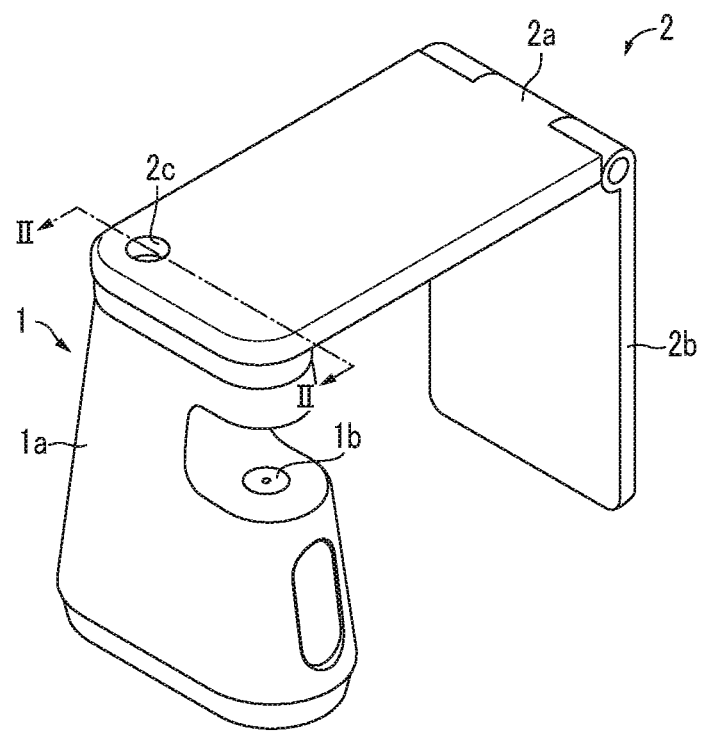
Figure 2:
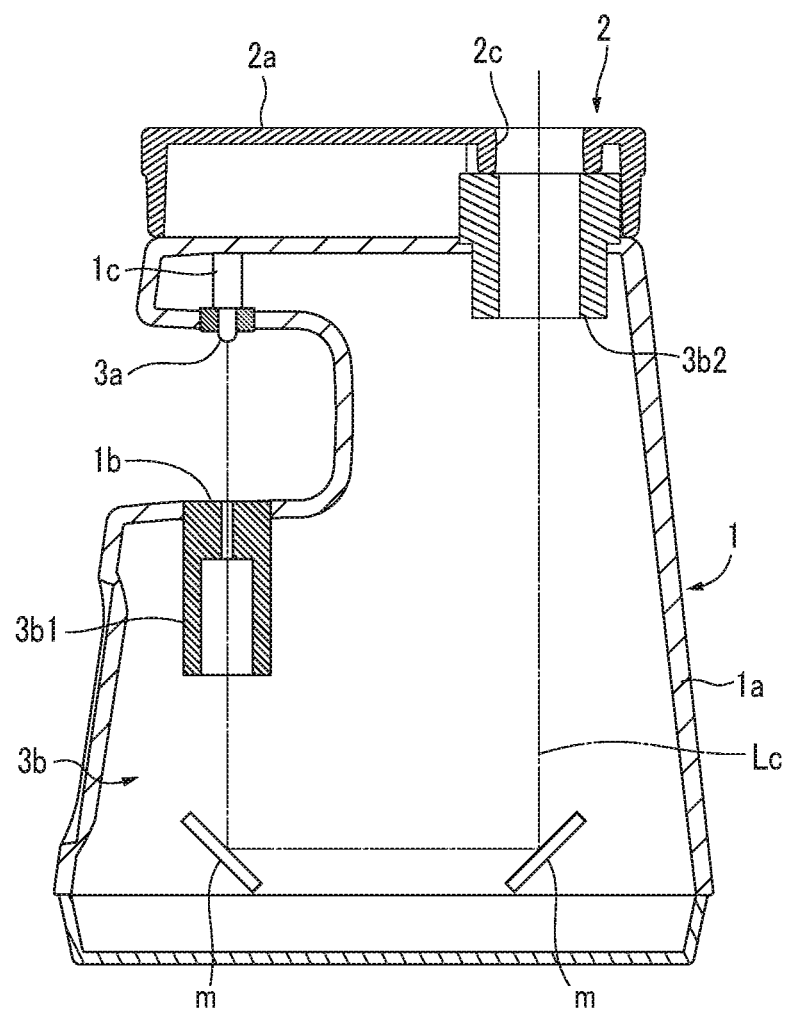
FIG. 2 is a sectional view taken along line II-II, illustrating the internal structure of the microscope of FIG. 1.

Referring first to FIG. 1 and FIG. 2, the configuration of the microscope M will be described.

As illustrated in FIG. 1A and FIG. 2, the microscope M is composed of a microscope main body 1, a mounting base 2, which can be detachably connected to the microscope main body 1, a portable information terminal P to be placed on the mounting base 2, and an optical system 3 (microscope optical system) disposed, extending from the inside of the microscope main body 1 to the inside of the portable information terminal P.

As illustrated in FIG. 1B and FIG. 2, the microscope main body 1 has a housing 1a, in which a recessed section that is concave in a horizontal direction has been formed, a specimen mounting section 1b provided on the lower side of the recessed section of the housing 1a, and a light source 1c, which is disposed on the upper side of the recessed section of the housing 1a and which applies light to the specimen mounting section 1b.

As the light source 1c, an LED is used. The LED is adopted as the light source 1c in this case, because the LED is advantageous in that the LED can be driven for an extended time on a dry cell or the like with less heat generation. There is an additional advantage in that, unlike an electric bulb or the like, the illumination light of the LED is white, so that better observation images can be easily obtained. It should be noted that the light source in the present invention is not limited to an LED and alternatively an incandescent lamp, a xenon lamp or the like insofar as the light source can apply sufficient illumination light to a specimen.

The mounting base 2 is configured to be a member shaped like an inverted L-shape by a plate-like mounting plate 2a on which the portable information terminal P is to be placed, and a plate-like supporting leg 2b which supports the mounting plate 2a. In the mounting plate 2a, a circular see-through window 2c is formed, penetrating from the surface on the side where the portable information terminal P is mounted to the surface on the side of the microscope main body 1. The see-through window 2c is formed at a position corresponding to a camera lens P1 (a second image forming lens group (114) of the portable information terminal P placed on the mounting base 2.

The optical system 3 is composed of a lighting optical system 3a for applying the light from the light source 1c to a specimen, and an objective optical system 3b for forming the light that has passed through the specimen into an image.

The lighting optical system 3a is disposed at a position which is inside the housing 1a of the microscope main body 1, which is adjacent to the lower surface of the light source 1c, and which opposes the specimen mounting section 1b.

The objective optical system 3b is composed of an objective lens group 3b1 disposed below the specimen mounting section 1b, a first image forming lens group 3b2 disposed at the position corresponding to the see-through window 2c of the housing 1a, and the camera lens P1 (not illustrated in FIG. 2) of the portable information terminal P.

The objective lens group 3b1 is disposed such that the surface thereof that is closest to an object is exposed to the specimen mounting section 1b, and a specimen, which is an object to be observed, is placed on the surface directly or adjacently thereto through the intermediary of a cover glass or the like.

The light which is emitted from the light source 1c and which has passed through the specimen passes through the objective lens group 3b1, and is reflected by mirrors m and exits to the outside (specifically, to a position corresponding to the see—through window 2c of the mounting base 2) of the housing 1a (i.e., the microscope main body 1) through the first image forming lens group 3b2.

The light exiting outside the housing 1a is formed into an image by the camera lens P1 (namely, the second image forming optical system that moves at the time of focusing) of the portable information terminal P placed on the mounting base 2. The image (i.e., the observation image of the specimen) is captured by an image pickup device incorporated in the portable information terminal P and displayed as a captured image (i.e., an observation image) on the display of the portable information terminal P.

Thus, in the microscope M, the objective lens group 3b1 and the first image forming lens group 3b2 (i.e., the lens group that does not move) incorporated in the microscope main body 1 are handled as a single unit by using the camera lens P1 mounted on the portable information terminal P as the second image forming lens group that moves at the time of focusing. This eliminates the need for providing the microscope main body 1 with a complex mechanism, thus making it possible to reduce the production cost of the microscope main body 1.

However, in order to make at least one of an objective lens group and a first image forming lens group replaceable, the lens group may be configured to be an independent unit that is detachably installed to a microscope main body.

Referring now to FIG. 3 to FIG. 8, the configuration of the optical system 3 will be described in detail.

In the sectional views along the optical axis of each lens group illustrated in FIG. 4 to FIG. 7, the numerals of r1, r2, . . . and d1, d2, . . . correspond to the surface numbers 1, 2, . . . in the numerical data. Further, in the numerical data to be discussed hereinafter, "s" denotes a surface number, "r" denotes the curvature radius of each surface, "d" denotes a surface interval, "nd" denotes the refractive index in a d-line (wavelength being 587.56 nm), "vd" denotes the Abbe number in the d-line, "K" denotes a conical coefficient, and "$A_2$" denotes an aspherical coefficient.

Further, in the aspherical coefficient of the numerical data, E denotes the power of 10. For example, "E-01" denotes the minus one power of 10. Further, each aspherical shape is represented by the expression given below, using each aspherical coefficient described in the numerical data. The coordinate in the direction along an optical axis is denoted by Z, and the coordinate in the direction perpendicular to the optical axis is denoted by Y.

$$Z=(Y^2/r)/[1+\{(1+k)-(Y/r)^2\}^{1/2}]+A_2Y^4$$

As described above, the optical system 3 is composed of the lighting optical system 3a disposed on an optical axis $L_c$ and the objective optical system 3b.

Figure 3:
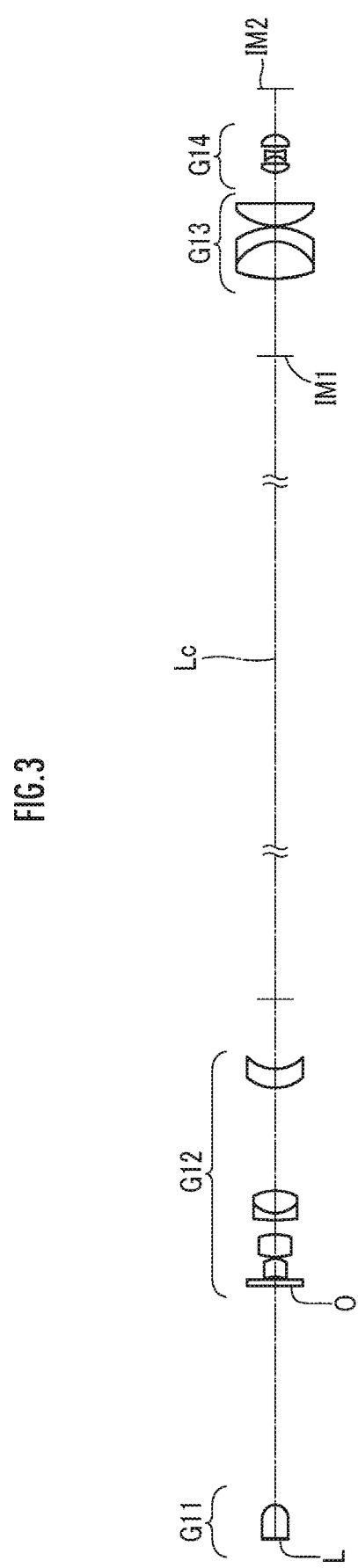
FIG. 3 is a sectional view along an optical axis, illustrating the configuration of the microscope optical system of the microscope of FIG. 1.

Further, as illustrated in FIG. 3, the lighting optical system 3a is composed of only an illumination lens group G11 in the optical system 3. The objective optical system 3b is composed of an objective lens group G12 (i.e., the objective lens group 3b1), a first image forming lens group G13 (i.e., the first image forming lens group 3b2), and the second image forming lens group G14 (i.e., the camera lens P1), which are disposed in this order from the Object side.

The light emitted from the light source 1c (a light emitting surface L) led to a specimen to be observed (i.e., an object surface O) through the illumination lens group G11. The light that has passed through the specimen is formed the first time into an image on a first image plane IM1 through the objective lens group G12. The image that has been formed on the first image plane IM1 is formed the second time into an image on a second image plane IM2 through the first image forming lens group G13 and the second image forming lens group G14. The second image plane IM2 coincides with the imaging surface of the image pickup device of the portable information terminal P, and the image formed on the surface is displayed on the display of the portable information terminal P.

Figure 4:
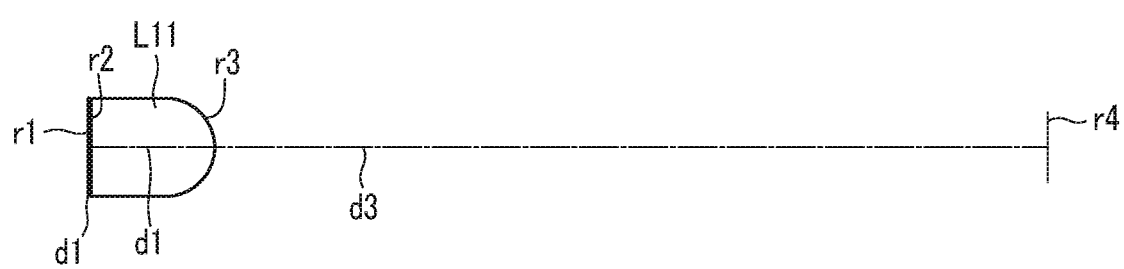
FIG. 4 is a sectional view along an optical axis, illustrating the configuration of the lighting optical system of the microscope optical system of FIG. 3.

As illustrated in FIG. 4, the illumination lens group G11 is composed of a plano-convex lens L11 which has a positive refractive power and has the convex surface thereof facing the object side.

The following presents the surface data related to the illumination lens group G11.

TABLE 1

Numerical data 1 (Illumination lens group)
unit: mm
Surface data

| Surface No. s | Curvature radius r | Surface interval d | Refractive index nd | Abbe number vd | Effective radius |
|---|---|---|---|---|---|
| 1 (light-emitting surface) | Inf | 0.2 | (phosphor) | | 0.5 |
| 2 | Inf | 5 | 1.411 | 53.3 | 2.4 |
| 3 | −2.5 | 35 | | | 2.4 |
| 4 (object surface) | Inf | | | | |

Figure 5:
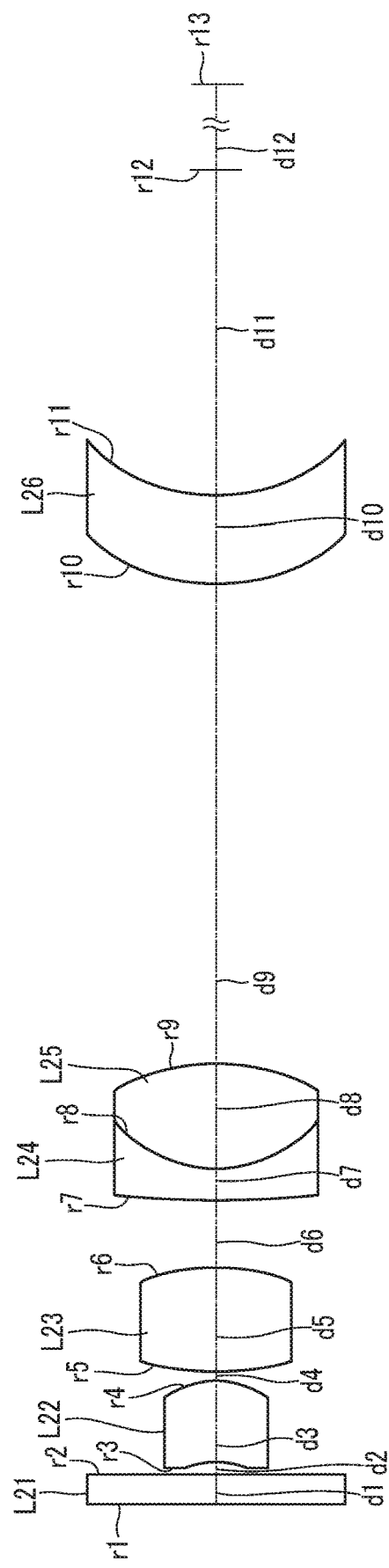
FIG. 5 is a sectional view along an optical axis, illustrating the configuration of the objective lens group of the objective optical system of the microscope optical system of FIG. 3.

As illustrated in FIG. 5, the objective lens group G12 is composed of a lens L21, which is a flat lens used as a cover glass, a lens L22, which is a meniscus lens having a negative refractive power and having the convex surface thereof facing the image side, a lens L23, which is a biconvex lens having a positive refractive power, a lens L24, which is a meniscus lens having a negative refractive power and having the concave surface thereof facing the image side, a lens L25, which is a biconvex lens having a positive refractive power, and a lens L26, which is a meniscus lens having a negative refractive power and has the concave surface thereof facing the image side, the lenses being arranged in this order from the object side.

In the objective lens group G12, the lens L24 and the lens L25 are joined. The surface on the object side (a tenth surface) and the surface on the image side (an eleventh surface) of the lens L26 are aspherical surfaces.

The following illustrates the surface data related to the objective lens group G12.

TABLE 2

Numerical data 2 (Objective lens group)
unit: mm

Surface data

| Surface No. s | Curvature radius r | Surface interval d | Refractive index nd | Abbe number vd |
|---|---|---|---|---|
| 1 (Object surface) | Inf | 1.00 | 1.52308 | 58.6 |
| 2 | Inf | 0.40 | | |
| 3 | −3.720 | 2.80 | 1.78590 | 44.2 |
| 4 | −3.734 | 0.29 | | |
| 5 | 10.031 | 3.60 | 1.51633 | 64.1 |
| 6 | −8.710 | 2.32 | | |
| 7 | 38.611 | 1.07 | 1.75520 | 27.5 |
| 8 | 5.471 | 3.59 | 1.48749 | 70.2 |
| 9 | −8.714 | 16.41 | | |
| 10 (Aspherical surface) | 9.047 | 3.00 | 1.68948 | 31.0 |
| 11 (Aspherical smface) | 8.957 | 11.12 | | |
| 12 | Inf | 140.00 | | |
| 13 (1st image plane) | Inf | | | |

Aspherical surface data

| 10th surface | $K = 1.39E{-}01, A_2 = 2.46E{-}04$ |
|---|---|
| 11th surface | $K = 8.53E{-}01, A_2 = 3.63E{-}04$ |

Figure 6:
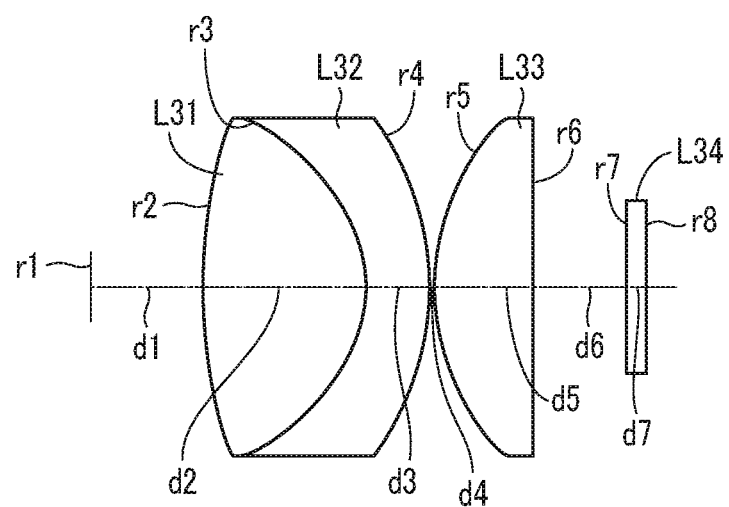
FIG. 6 is a sectional view along an optical axis, illustrating the configuration of the first image forming lens group of the objective optical system of the microscope optical system of FIG. 3.

As illustrated in FIG. 6, the first image forming lens group G13 is composed of a lens L31, which is a biconvex lens having a positive refractive power, a lens L32, which is a meniscus lens having a negative refractive power and having the convex surface thereof facing the image side, a lens L33, which is a plano-convex lens having a positive refractive power and having the flat surface thereof facing the image side, and a lens L34, which is a flat lens.

Further, in the first image forming lens group G13, the lens L31 and the lens L32 are joined.

The following illustrates the surface data related to the first image forming lens group G13.

TABLE 3

Numerical data 3 (First image forming lens group)
unit: mm
Surface data

| Surface No. s | Curvature radius r | Surface interval d | Refractive index nd | Abbe number vd |
|---|---|---|---|---|
| 1 (First image plane) | Inf | 5.89 | | |
| 2 | 22.298 | 5 | 1.51633 | 64.1 |
| 3 | −6.717 | 2 | 1.84666 | 23.8 |
| 4 | −11.402 | 0.2 | | |
| 5 | 9.785 | 3 | 1.51633 | 64.1 |
| 6 | Inf | 3 | | |
| 7 | Inf | 0.5 | 1.52308 | 58.6 |
| 8 | Inf | | | |

As indicated by the above numeral data 3, the lens L34, which is a flat lens, is disposed closest to the image side in the first image forming lens group G13 (i.e., between the first image forming lens group G13 and the second image forming lens group G14). Further, the lens L34 is fixed at the time of focusing. Thus, in the objective optical system 3b, the first image forming lens group G13 and the second image forming lens group G14 are configured to be separable as independent optical systems.

However, the lens L34 is not limited to a lens shaped like a flat plate, and may alternatively use a spherical or an aspherical lens according to the shape of the housing 1a (the placement space of the first image forming lens group G13), required optical performance, or the like.

Figure 7:
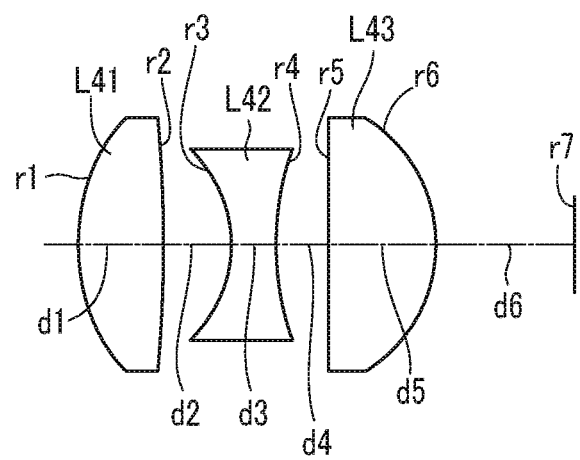
FIG. 7 is a sectional view along an optical axis, illustrating the configuration of the second image forming lens group of the Objective optical system of the microscope optical system of FIG. 3.

As illustrated in FIG. 7, the second image forming lens group G14 is composed of a lens L41, which is a biconvex lens having a positive refractive power, a lens L42, which is a biconcave lens having a negative refractive power, and a lens L43, which is a meniscus lens having a positive refractive power and having the convex surface thereof facing the image side.

In the optical system 3, focusing is performed by moving the entire second image forming lens group G14 along the optical axis $L_c$. More specifically, the focusing is performed by changing the surface interval (6.6 mm) related to the surface number 6 in the numerical data 4, which will be discussed later. The focusing is not limited to the foregoing method, and may alternatively be performed by moving a part of the second image forming lens group G14 along the optical axis.

The following illustrates the surface data related to the second image forming lens group G14.

TABLE 4

Numerical data 4 (Second image forming lens group)
unit: mm
Surface data

| Surface No. s | Curvature radius r | Surface interval d | Refractive index nd | Abbe number vd |
|---|---|---|---|---|
| 1 | 3.565 | 1.2 | 1.62041 | 60.3 |
| 2 | −17.768 | 1 | | |
| 3 | −2.186 | 0.6 | 1.62004 | 36.4 |
| 4 | 4.617 | 0.8 | | |
| 5 | −65.010 | 1.5 | 1.62041 | 60.3 |
| 6 | −2.456 | 6.6 | | |
| 7 (2nd image plane) | Inf | | | |

The following illustrates various data related to the entire optical system 3.

the solid line denotes the aberration of the dotted line denotes the aberration of the d-line, and the chain line denotes the aberration of C-line. In FIG. 8B (astigmatism), the solid line denotes a tangential plane, and the dotted line denotes a sagittal plane.

As indicated by the foregoing various data 1, in the optical system 3, the numerical aperture $NA_L$ of the lighting optical system 3a is 0.069, the numerical aperture $NA_O$ of the objective lens group 3b1 is 0.2, and the image-formation magnification $M_O$ of the objective lens group 3b1 is 30, thus satisfying conditional expressions (1), (2) and (3) given below.

$$NA_L \times 2NA_O \leq NA_L \times 15 \quad (1)$$

$$0.01 \leq NA_L \leq 0.1 \quad (2)$$

$$25 \leq M_O \leq 100 \quad (3)$$

Conditional expressions (1) and (2) are conditional expressions for securing proper contrast and resolution. Further, conditional expression (3) is a conditional expression for enabling a specimen of one micron order to be observed in an appropriate size by using an image pickup device of a regular size.

As is obvious from the aberration diagrams of FIG. 8 and the observation images (i.e., captured images) of FIG. 13 to FIG. 20, which will be described later, the optical system 3 that satisfies the foregoing conditional expressions (1), (2) and (3) can provide a captured image that has a proper size and sufficient contrast and resolution even if a specimen of

TABLE 5

Various data 1

| | |
|---|---|
| Numerical aperture of lighting optical system ($NA_L$) | 2.4/35 = 0.069 |
| Numerical aperture of objective lens group ($NA_O$) | 0.2 |
| Image-formation magnification of objective lens group ($M_O$) | 30 |
| Effective diameter of lighting optical system (Ed) | 2.4 × 2 = 4.8 mm |
| Distance from specimen-side end surface of lighting optical system to specimen (D) (d3 in numerical data 1) | 35 mm |

Figure 8C:
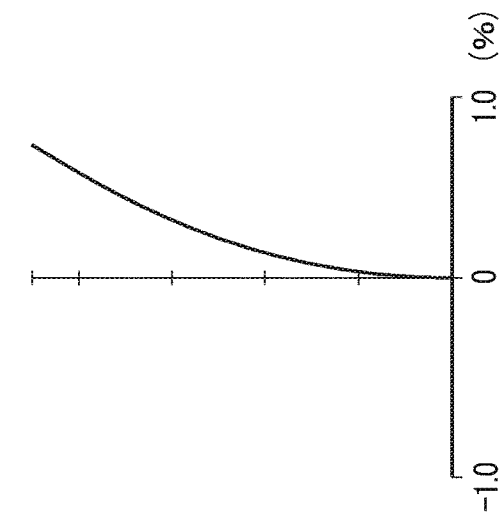
FIGS. 8A to 8C present the aberration curve diagrams of the microscope optical system of FIG. 3, FIG. 8A illustrating spherical aberration, FIG. 8B illustrating astigmatism, and FIG. 8C illustrating distortion aberration.
Figure 8B:
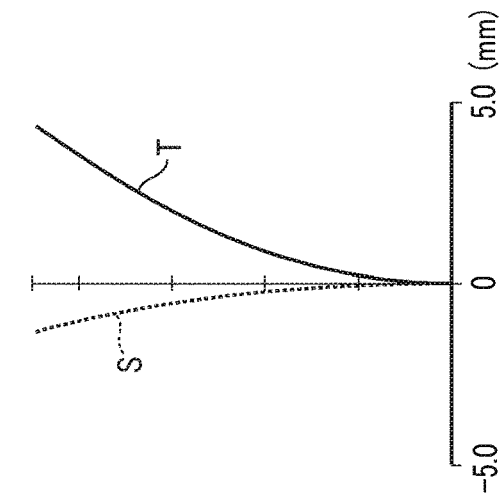
Figure 8A:
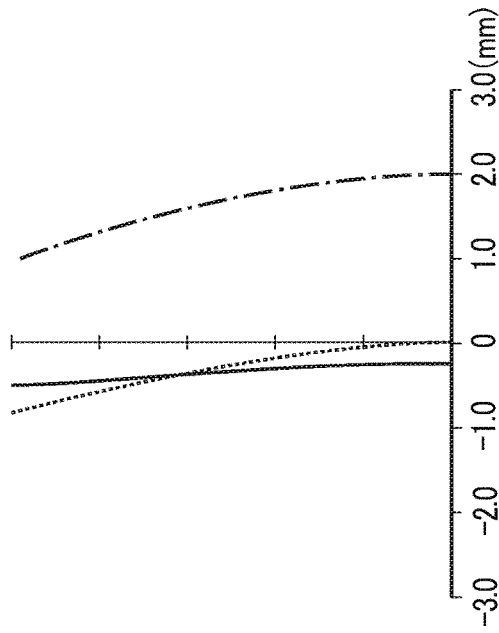

FIG. 8 presents the aberration diagrams related to the objective lens group 3b1 of the objective optical system 3b of the optical system 3. In FIG. 8, FIG. 8A illustrates spherical aberration (SA (mm)), FIG. 8B illustrates astigmatism (AST (mm)), and FIG. 8C illustrates distortion aberration (DIS (%)). In FIG. 8A (the spherical aberration), one micron order is placed in contact with or adjacent to a surface of the objective optical system 3b, which surface is closest to the object side. This makes it possible to capture an image of a specimen to be observed while securing a sufficient image quality by the camera function provided in the portable information terminal P.

Further, in the optical system 3, the effective diameter Ed (the value obtained by doubling the effective radius) of the lighting optical system 3a is 4.8 mm, thus satisfying a conditional expression (4) given below.

$$2 \text{ mm} \leq Ed \leq 8 \text{ mm} \quad (4)$$

The optical system 3 satisfies the conditional expression (4), so that a sufficient amount of light is obtained, and the occurrence of flare is prevented. However, the optical system or a microscope in accordance with the present invention does not necessarily have to satisfy the conditional expression (4) insofar as the conditional expressions (1), (2) and (3) are satisfied.

Further, in the optical system 3, the distance D (i.e., d3 in the foregoing numerical data 1) from the specimen-side end surface of the lighting optical system 3a to the specimen is 35 mm, thus satisfying a conditional expression (5) given below.

$$5 \text{ mm} \leq D \leq 50 \text{ mm} \quad (5)$$

The optical system 3 satisfies the conditional expression (5), so that the size of the optical system for a microscope (consequently, the microscope in which the optical system is installed) and the required level of adjustment accuracy for an illumination optical axis can be reduced while securing a sufficient workspace for mounting a specimen. However, the optical system for a microscope in accordance with the present invention does not necessarily have to satisfy the conditional expression (5) insofar as the conditional expressions (1), (2) and (3) are satisfied.

Second Embodiment

Referring to FIG. 9 to FIG. 12, the following will describe an optical system used in a microscope according to a second embodiment. However, the microscope of the present embodiment differs from the microscope M of the first embodiment only in the configuration of the illumination lens group constituting a lighting optical system and the configuration of the objective lens group of the objective optical system. The description will be focused only on the numerical data related to the configuration of the illumination lens group constituting the lighting optical system and the configuration of the objective lens group of the objective optical system, and various data related to the entire optical system.

Figure 10:
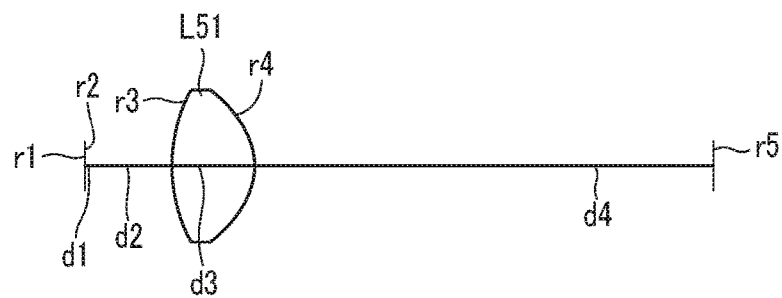
FIG. 10 is a sectional view along an optical axis, illustrating the configuration of the lighting optical system of the microscope optical system of FIG. 9.
Figure 11:
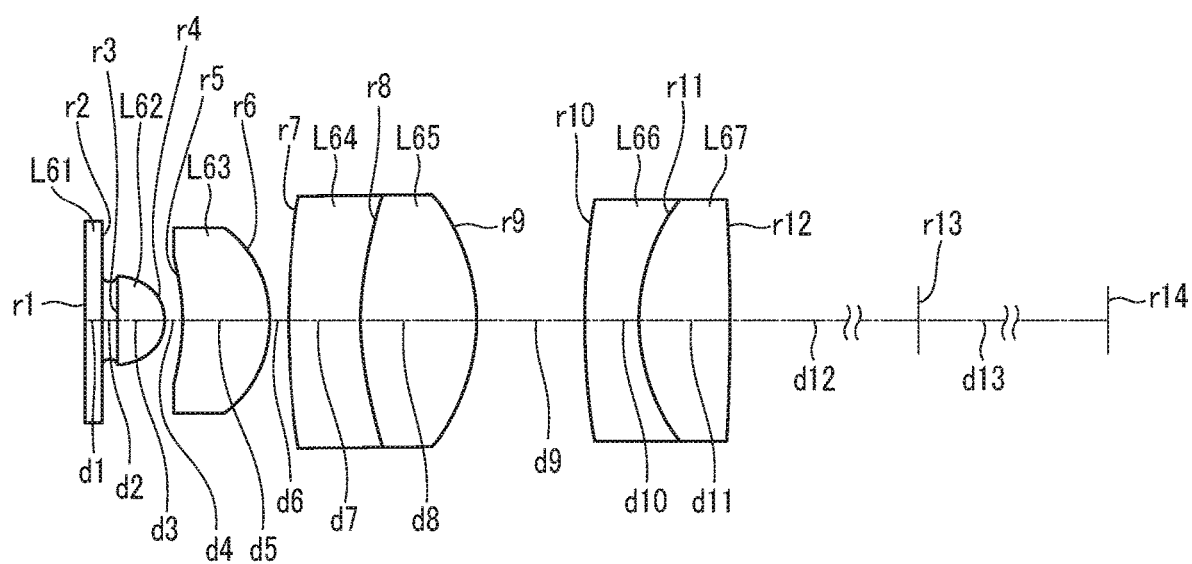
FIG. 11 is a sectional view along an optical axis, illustrating the configuration of the objective lens group of the objective optical system of the microscope optical system of FIG. 9.

In the sectional views along the optical axis of each lens group illustrated in FIG. 10 and FIG. 11, the numerals of r1 and d1, d2, . . . correspond to the surface numbers 1, 2, . . . in the numerical data. Further, in the numerical data to be discussed hereinafter, "s" denotes a surface number, "r" denotes the curvature radius of each surface, "d" denotes a surface interval, "nd" denotes the refractive index in a d-line (wavelength being 587.56 nm), and "vd" denotes the Abbe number in the d-line.

The optical system of the present embodiment is composed of a lighting optical system and an objective optical system that are disposed on an optical axis $L_c$.

Further, as illustrated in FIG. 9, in the optical system of the present embodiment, the lighting optical system is composed of only an illumination lens group G21. The objective optical system is composed of an objective lens group G22 (i.e., the objective lens group 3b1), a first image forming lens group G13 (i.e., the first image forming lens group 3b2), and a second image forming lens group G14 (i.e., a camera lens P1) disposed in this order from the object side.

The light emitted from a light source (a light emitting surface L) is led to a specimen to be observed (namely, an object surface O) through an illumination lens group G21. The light that has passed through the specimen is formed the first time into an image on a first image plane IM1 through the objective lens group G22. The image that has been formed on the first image plane IM1 is formed the second time into an image on a second image plane IM2 through the first image forming lens group G13 and the second image forming lens group G14. The second image plane IM2 coincides with the imaging surface of the image pickup device of a portable information terminal P. and the image formed on the surface is displayed on the display of the portable information terminal P.

As illustrated in FIG. 10, the illumination lens group G21 is composed of a biconvex lens L51 which has a positive refractive power.

The following presents the surface data related to the illumination lens group G21.

TABLE 6

Numerical data 5 (Illumination lens group)
unit: mm
Surface data

| Surface No. s | Curvature radius r | Surface interval d | Refractive index nd | Abbe number vd | Effective radius |
|---|---|---|---|---|---|
| 1 (light-emitting surface) | Inf | 0.2 | (phosphor) | | 0.5 |
| 2 | Inf | 5 | | | 0.5 |
| 3 | 10 | 5 | 1.51633 | 64.1 | 2.6 |
| 4 | −6 | 28 | | | 2.6 |
| 4 (object surface) | Inf | | | | |

As illustrated in FIG. 11, the objective lens group G22 is composed of a lens L61, which is a flat lens used as a cover glass, a lens L62, which is a plano-convex lens having a positive refractive power and having the convex surface thereof facing an image side, a lens L63, which is a meniscus lens having a positive refractive power and having the convex surface thereof facing the image side, a lens L64, which is a meniscus lens having a negative refractive power and having the concave surface thereof facing the image side, a lens L65, which is a biconvex lens having a positive refractive power, a lens L66, which is a meniscus lens having a negative refractive power and having the concave surface thereof facing the image side, and a lens L67, which is a biconvex lens having a positive refractive power, the lenses being disposed in this order from the object side.

Further, in the objective lens group G22, the lens L64 and the lens L65 are joined, and the lens L66 and the lens L67 are joined. In addition, the objective lens group G22 is configured such that an oil immersion liquid exists between the lens L61 and the lens L62 at the time of observation.

The following illustrates the surface data related to the objective lens group G22.

TABLE 7

Numerical data 6 (Objective lens group)
unit: mm
Surface data

| Surface No. s | Curvature radius r | Surface interval d | Refractive index nd | Abbe number vd |
|---|---|---|---|---|
| 1 (Object surface) | Inf | 0.17 | 1.52308 | 58.6 |
| 2 (Oil immersion liquid) | Inf | 0.23 | 1.51500 | 58.5 |
| 3 | Inf | 0.88 | 1.51633 | 64.1 |
| 4 | −0.867 | 0.08 | | |
| 5 | −7.059 | 1.53 | 1.64250 | 58.4 |
| 6 | −2.385 | 0.22 | | |
| 7 | 14.444 | 1.41 | 1.74950 | 35.3 |
| 8 | 4.550 | 2.15 | 1.49700 | 81.5 |
| 9 | −4.516 | 2.03 | | |
| 10 | 16.797 | 1.04 | 1.72825 | 28.5 |
| 11 | 4.005 | 1.72 | 1.50137 | 56.4 |
| 12 | −27.689 | 33.60 | | |
| 13 | Inf | 150.00 | | |
| 14 (1st image plane) | Inf | | | |

The following illustrates various data related to the entire optical system of the present embodiment.

TABLE 8

Various data 2

| | |
|---|---|
| Numerical aperture of lighting optical system ($NA_L$) | 2.6/28 = 0.093 |
| Numerical aperture of objective lens group ($NA_O$) | 1.2 |
| Image-formation magnification of objective lens group ($M_O$) | 100 |
| Effective diameter of lighting optical system (Ed) | 2.6 × 2 = 5.2 mm |
| Distance from specimen-side end surface of lighting optical system to specimen (D) (d3 in numerical data 5) | 28 mm |

Figure 12C:
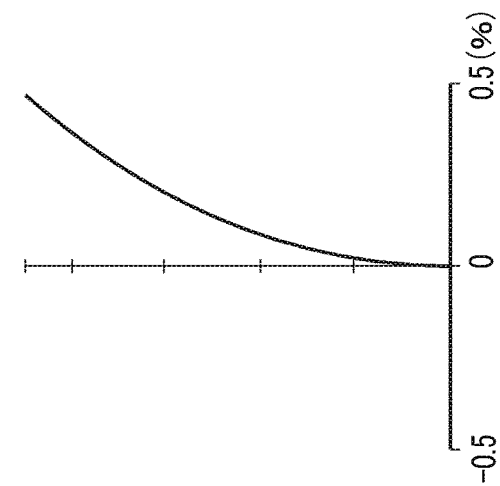
FIGS. 12A to 12C present the aberration curve diagrams of the microscope optical system of FIG. 9, FIG. 12A illustrating spherical aberration, FIG. 12B illustrating astigmatism, and FIG. 12C illustrating distortion aberration.
Figure 12B:
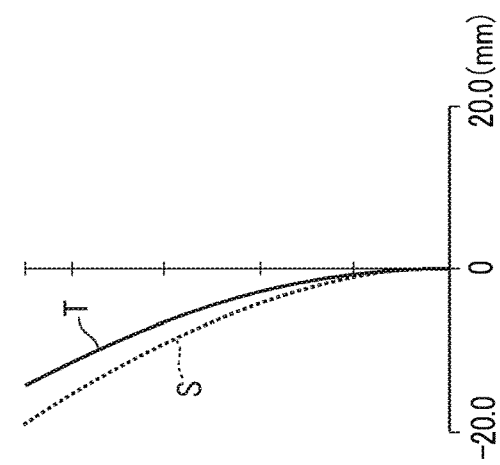
Figure 12A:
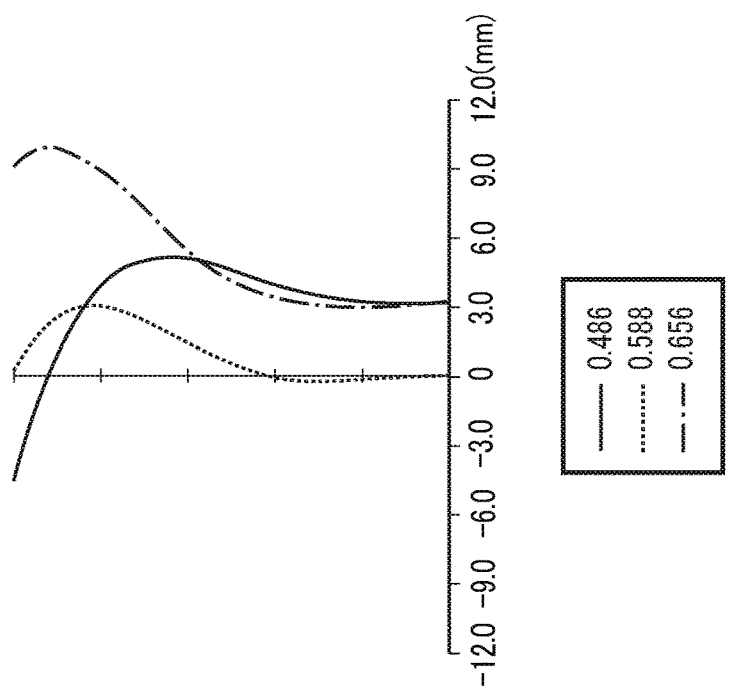

FIG. 12 presents the aberration diagrams related to the objective lens group of the objective optical system of the optical system according to the present embodiment. In FIG. 12, FIG. 12A illustrates spherical aberration (SA (mm)), FIG. 12B illustrates astigmatism (AST (mm)), and FIG. 12C illustrates distortion aberration (DIS (%)). In FIG. 12A (the spherical aberration), the solid line denotes the aberration of F-line, the dotted line denotes the aberration of d-line, and the chain line denotes the aberration of C-line. In FIG. 12B (astigmatism), the solid line denotes a tangential plane, and the dotted line denotes a sagittal plane.

As indicated by the foregoing various data 2, in the optical system of the present embodiment, the numerical aperture $NA_L$ of the lighting optical system is 0.093, the numerical aperture $NA_O$ of the objective lens group is 1.2, and the image-formation magnification $M_O$ of the objective lens group is 100, thus satisfying conditional expressions (1), (2) and (3) given below.

$$NA_L \times 2 \leq NA_O \leq NA_L \times 15 \quad (1)$$

$$0.01 \leq NA_L \leq 0.1 \quad (2)$$

$$25 \leq M_O \leq 100 \quad (3)$$

Conditional expressions (1) and (2) are conditional expressions for securing proper contrast and resolution. Further, conditional expression (3) is a conditional expression for enabling a specimen of one micron order to be observed in an appropriate size by using an image pickup device of a regular size.

As is obvious from the aberration diagrams of FIG. 12 and the observation images (i.e., captured images) of FIG. 13 to FIG. 20, which will be described later, the optical system of the present embodiment that satisfies the foregoing conditional expressions (1), (2) and (3) can provide a captured image that has a proper size and sufficient contrast and resolution even if a specimen of one micron order is placed in contact with or adjacent to the surface of the objective optical system, which surface is closest to the object side. This makes it possible to capture an image of a specimen to be observed while securing a sufficient image quality by the camera function provided in the portable information terminal P.

Further, in the optical system, the effective diameter Ed (the value obtained by doubling the effective radius) of the lighting optical system is 5.2 mm, thus satisfying a conditional expression (4) given below.

$$2 \text{ mm} \leq Ed \leq 8 \text{ mm} \quad (4)$$

The optical system of the present embodiment satisfies the conditional expression (4), so that a sufficient amount of light is obtained, and the occurrence of flare is prevented.

Further, in the optical system of the present embodiment, the distance D (i.e., d3 in the foregoing numerical data 5) from the end surface of the lighting optical system on the specimen side to the specimen is 28 mm, thus satisfying a conditional expression (5) given below.

$$5 \text{ mm} \leq D \leq 50 \text{ mm} \quad (5)$$

The optical system of the present embodiment satisfies the conditional expression (5), so that the size of the optical system for a microscope (consequently, the microscope in which the optical system is installed) and the level of adjustment accuracy required for an illumination optical axis can be reduced while securing a sufficient workspace for mounting a specimen.

[Experiment Data]

Figure 13:
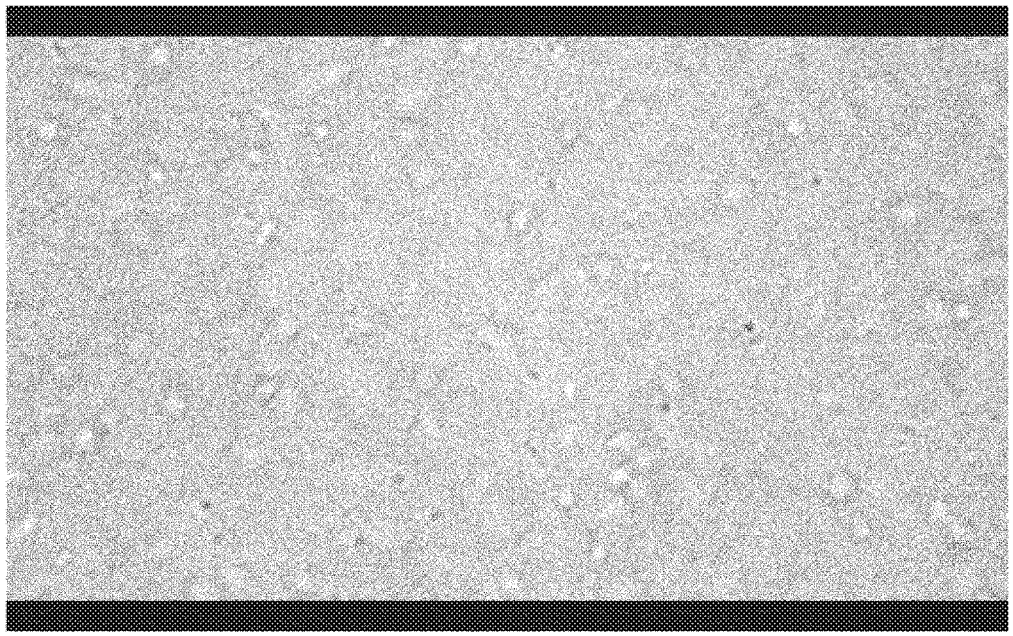
FIG. 13 is a photograph illustrating an observation image of *Escherichia coli* observed by the microscope of FIG. 1 or FIG. 9.
Figure 14:
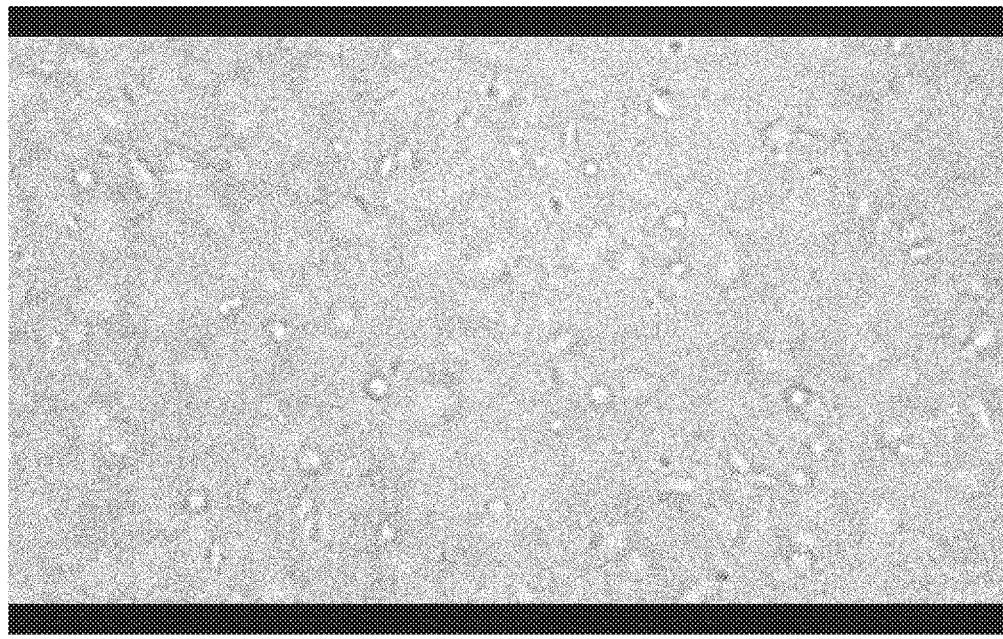
FIG. 14 is a photograph illustrating an observation image of *Salmonella* observed by the microscope of FIG. 1 or FIG. 9.
Figure 15:
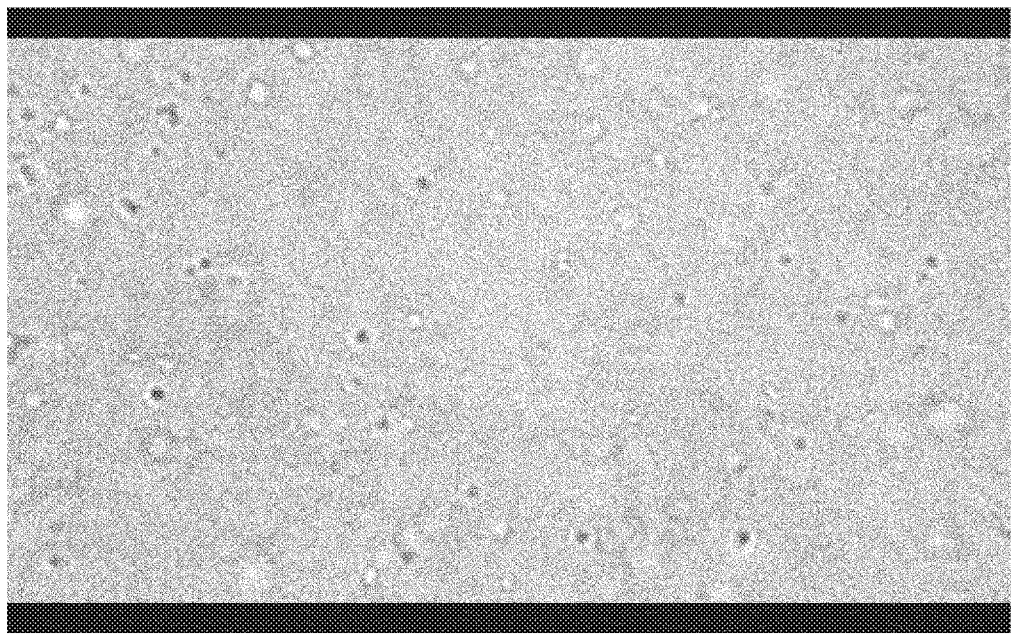
FIG. 15 is a photograph illustrating an observation image of *Staphylococcus aureus* observed by the microscope of FIG. 1 or FIG. 9.
Figure 16:
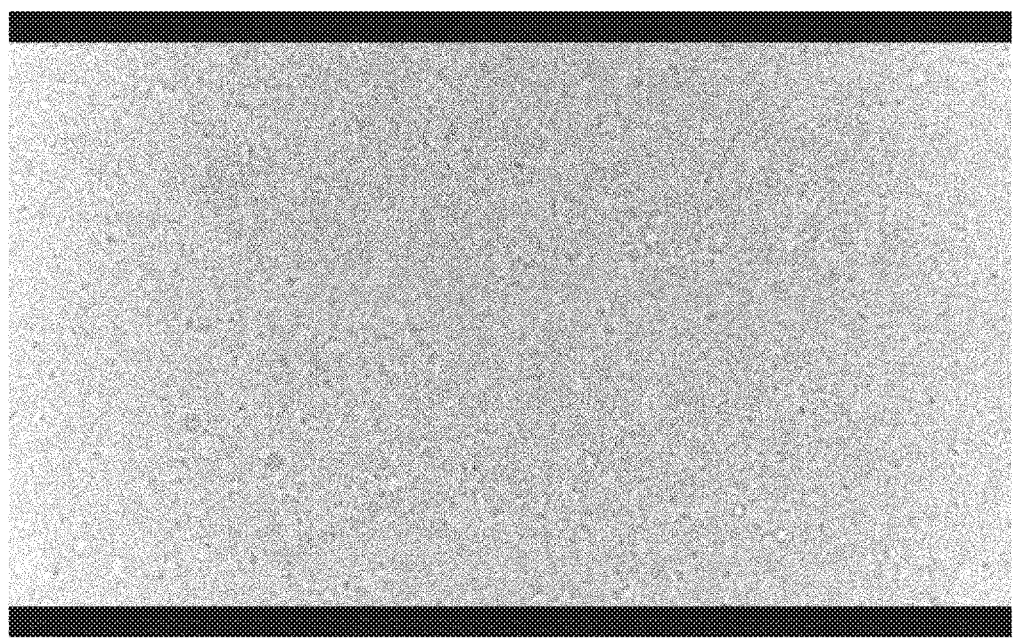
FIG. 16 is a photograph illustrating an observation image of *Pseudomonas aeruginosa* observed by the microscope of FIG. 1 or FIG. 9.
Figure 17:
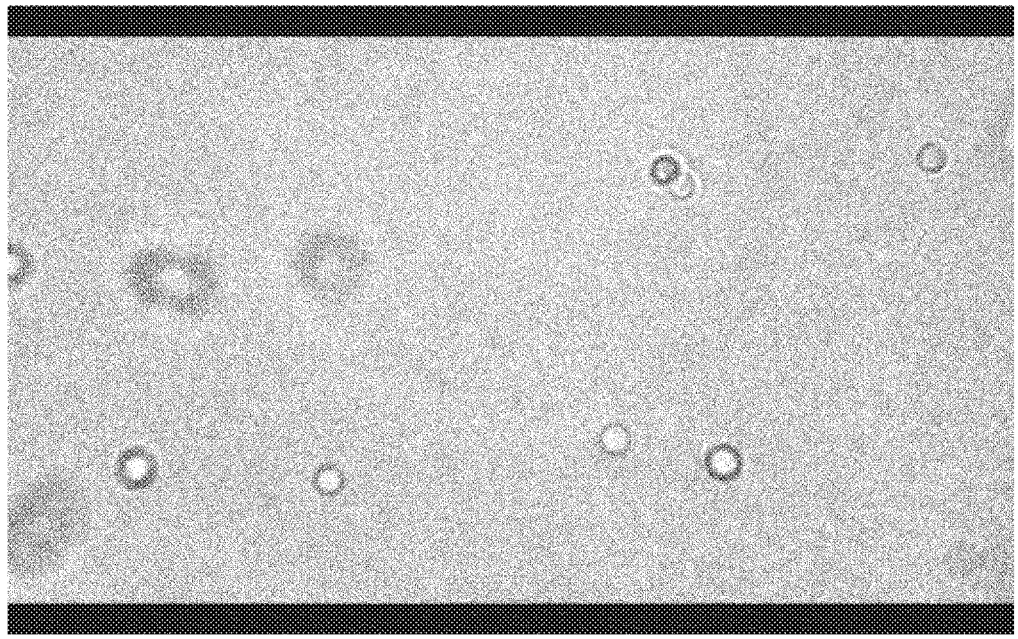
FIG. 17 is a photograph illustrating an observation image of the spores of blue mold observed by the microscope of FIG. 1 or FIG. 9.
Figure 18:
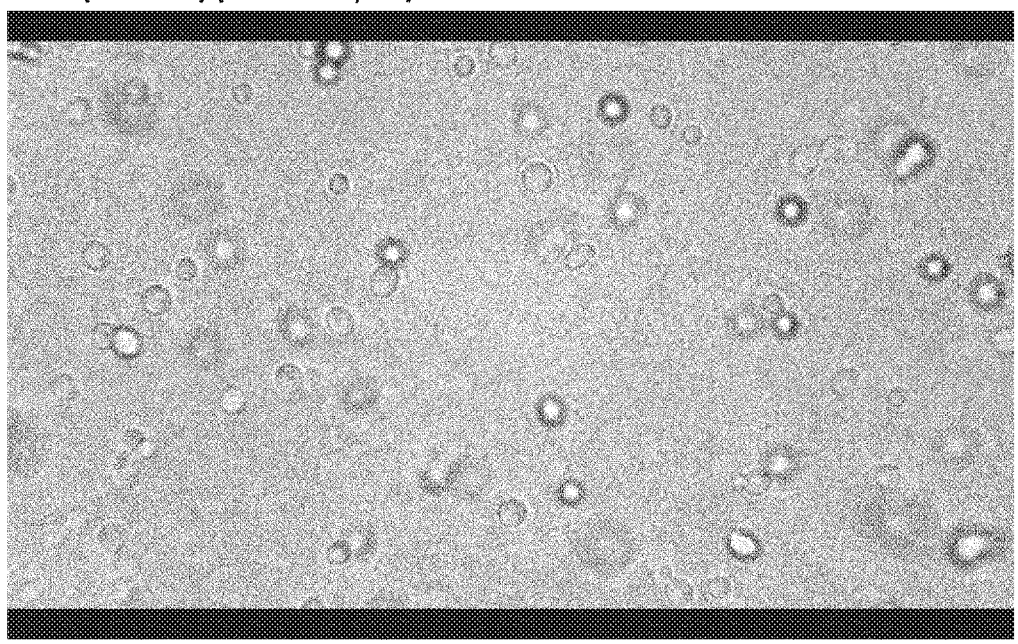
FIG. 18 is a photograph illustrating an observation image of yeast (candida) observed by the microscope of FIG. 1 or FIG. 9.
Figure 19:
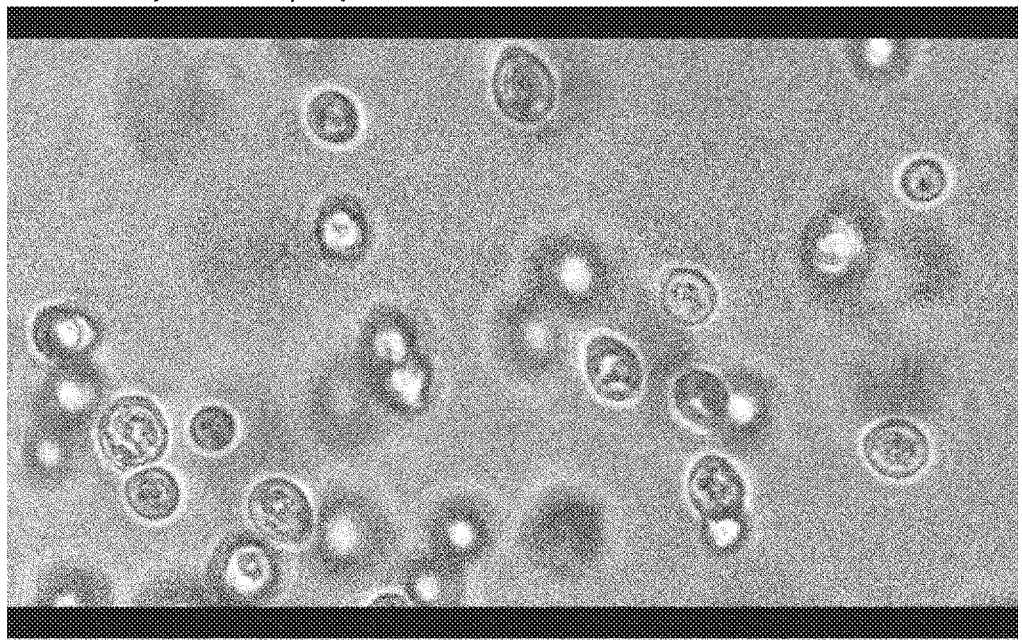
FIG. 19 is a photograph illustrating an observation image of wine yeast observed by the microscope of FIG. 1 or FIG. 9.
Figure 20:
FIG. 20 is a photograph illustrating an observation image of intraoral bacteria observed by the microscope of FIG. 1 or FIG. 9.

FIG. 13 to FIG. 20 illustrate the observation images by a microscope provided with one of the optical systems described above. FIG. 13 illustrates an observation image of *Escherichia coli* (approximately 3 μm), FIG. 14 illustrates an observation image of *Salmonella* (approximately 2 μm), FIG. 15 illustrates an observation image of *Staphylococcus aureus* (approximately 1 μm), FIG. 16 illustrates an observation image of *Pseudomonas aeruginosa* (approximately 3 μm), FIG. 17 illustrates an observation image of the spores of blue mold (approximately 4 μm), FIG. 18 illustrates an observation image of yeast (candida) (approximately 5 μm), FIG. 19 is an observation image of wine yeast (approximately 5 μm), and FIG. 20 is an observation image of intraoral bacteria (approximately 0.5 to 10 μm).

DESCRIPTION OF REFERENCE NUMERALS

1 ... microscope main body; 1*a* ... housing; 1*b* ... specimen mounting section; 1*c* ... light source; 2 ... mounting base; 2*a* ... mounting plate; 2*b* ... supporting leg; ... see-through window; 3 ... optical system (optical system for a microscope); 3*a* ... lighting optical system; 3*b* ... objective optical system; 3*b*1 ... objective lens group; 3*b*2 ... first image forming lens group; IM1 ... first image plane; IM2 ... second image plane; L ... light emitting surface; $L_c$ ... optical axis; M ... microscope; m ... mirror; O ... object surface; P ... portable information terminal; and P1 ... camera lens (second image forming lens group).

The invention claimed is:

1. An optical system for a microscope used in a microscope that captures an image of a specimen to be observed by a camera function provided in a portable information terminal, and displays the captured image on a display of the portable information terminal, comprising:

a lighting optical system for applying light from a light source to the specimen; and an objective optical system for forming the light that has passed through the specimen into an image, wherein the objective optical system has an objective lens group disposed inside the microscope, a first image forming lens group disposed inside the microscope, and a second image forming lens group disposed inside the portable information terminal, which are arranged in this order from an object side, the objective lens group forms an image of the specimen on a first image plane positioned between the objective lens group and the first image forming lens group, the first image forming lens group and the second image forming lens group re-forms the image formed on the first image plane on a second image plane that coincides with an imaging surface of an image pickup element for constituting a camera function of the portable information terminal, focusing is performed by moving a part or all of the second image forming lens group along an optical axis, the specimen is disposed in contact with or adjacent to a surface of the objective lens group, the surface being closest to an object, and conditional expressions (1), (2-1), (4-2) and (5-1) given below are satisfied:

$$NA_L \times 2 \leq NA_O \leq NA_L \times 15 \quad (1)$$

$$0.07 \leq NA_L 0.09 \quad (2\text{-}1)$$

$$4.8 \text{ mm} \leq Ed \leq 5.2 \text{ mm} \quad (4\text{-}2)$$

$$28 \text{ mm} \leq D \leq 35 \text{ mm} \quad (5\text{-}1)$$

where $NA_L$ denotes a numerical aperture of the lighting optical system, $NA_O$ denotes a numerical aperture of the objective lens group, Ed denotes an effective diameter of the lighting optical system, and D denotes a distance from the specimen-side end surface of the lighting optical system to the specimen.

2. A microscope provided with the optical system according to claim 1, comprising:

a microscope main body; and a mounting base which is connected to the microscope main body and on which the portable information terminal is mounted, wherein the microscope main body has a specimen mounting section for mounting the specimen thereon and a light source for applying light to the specimen mounting section, the lighting optical system of the optical system for a microscope is disposed between the specimen mounting section and the light source, the objective lens group of the optical system for a microscope is disposed inside the microscope main body such that a surface of the objective lens group, the surface being closest to an object, is exposed at the specimen mounting section, the first image forming lens group of the optical system for a microscope is disposed at an image side of the objective lens group inside the microscope main body, and the second image forming lens group of the optical system for a microscope is disposed inside the portable information terminal.

3. The microscope according to claim 2, wherein the light source is an LED.

* * * * *